(12) United States Patent
Prevot et al.

(10) Patent No.: US 9,556,982 B2
(45) Date of Patent: Jan. 31, 2017

(54) CLAMPING DEVICE FOR COUPLING SMOOTH TUBES TOGETHER IN LEAKTIGHT MANNER

(71) Applicant: ETABLISSEMENTS CAILLAU, Issy les Moulineaux (FR)

(72) Inventors: Fabrice Prevot, Selles sur Cher (FR); Nicolas Rigollet, Romorantin (FR); Cyriaque Fouqueray, Romorantin (FR)

(73) Assignee: ETABLISSEMENTS CAILLAU, Issy les Moulineaux (FR)

( * ) Notice: Subject to any disclaimer, the term of this patent is extended or adjusted under 35 U.S.C. 154(b) by 18 days.

(21) Appl. No.: 14/249,982

(22) Filed: Apr. 10, 2014

(65) Prior Publication Data

US 2014/0306449 A1 Oct. 16, 2014

(51) Int. Cl.
*F16L 21/06* (2006.01)
*F16L 21/00* (2006.01)

(52) U.S. Cl.
CPC .............. *F16L 21/06* (2013.01); *F16L 21/005* (2013.01); *F16L 21/065* (2013.01)

(58) Field of Classification Search
CPC ................................ F16L 21/065; F16L 23/08
USPC ........ 285/420, 410, 367, 373, 419; 24/20 LS, 24/279
See application file for complete search history.

(56) References Cited

U.S. PATENT DOCUMENTS

| | | | | |
|---|---|---|---|---|
| 1,510,394 A | * | 9/1924 | Frazier | F16L 55/172 285/373 |
| 2,893,097 A | * | 7/1959 | Hill | F16L 33/04 24/279 |
| 2,936,503 A | * | 5/1960 | Rindfleisch | F16L 23/10 24/279 |
| 3,235,293 A | * | 2/1966 | Condon | F16L 49/04 285/367 |
| 4,049,298 A | | 9/1977 | Foti | |
| 4,165,109 A | * | 8/1979 | Foti | F01N 13/1805 285/420 |
| 5,131,698 A | * | 7/1992 | Calmettes | F01N 13/1805 285/420 |
| 5,362,107 A | * | 11/1994 | Bridges | F16L 21/06 285/373 |
| 6,877,780 B2 | * | 4/2005 | Potts | F16L 21/005 285/373 |
| 7,802,821 B2 | * | 9/2010 | Rigollet | B25B 7/02 285/420 |

(Continued)

FOREIGN PATENT DOCUMENTS

| EP | 0069098 A2 | 1/1993 |
|---|---|---|
| GB | 2229245 A | 9/1990 |

OTHER PUBLICATIONS

The EPO Search Report mailed Dec. 12, 2103 for French Application No. 1353263, 2 pages.

*Primary Examiner* — David E Bochna
(74) *Attorney, Agent, or Firm* — Lee & Hayes, PLLC (57) ABSTRACT

A device includes a sealing ring that clamps around facing ends of two tubes, and that has first and second free ends, each of which is provided with a sealing arrangement suitable for coming into leaktight contact. First and second tightening lugs are fastened to the sealing ring in the vicinities of the first and the second free ends. The device has a bridge covering the sealing arrangements, the bridge being mounted to be stationary relative to the first free end of the ring and suitable for sliding relative to the second free end of the ring.

20 Claims, 6 Drawing Sheets

(56) References Cited

U.S. PATENT DOCUMENTS

| | | | |
|---|---|---|---|
| 8,336,172 B2* | 12/2012 | Prevot | F16L 23/08 24/279 |
| 8,523,243 B2* | 9/2013 | Geese | F16L 21/005 285/252 |
| 2002/0038495 A1* | 4/2002 | Anthes | F16L 33/04 24/279 |
| 2003/0015872 A1 | 1/2003 | Potts | |
| 2005/0264012 A1* | 12/2005 | Ignaczak | F16L 21/065 285/417 |
| 2011/0210546 A1 | 9/2011 | Geese | |
| 2012/0018999 A1 | 1/2012 | Geese | |
| 2012/0205909 A1* | 8/2012 | Bird | F16L 21/022 285/337 |
| 2013/0154259 A1* | 6/2013 | Chiproot | F16L 21/022 285/337 |

* cited by examiner

CLAMPING DEVICE FOR COUPLING SMOOTH TUBES TOGETHER IN LEAKTIGHT MANNER

CROSS-REFERENCE TO RELATED APPLICATIONS

This application claims priority under 35 U.S.C. §119 to French Patent Application No. 1353263, filed Apr. 11, 2013, which is incorporated herein by reference in its entirety.

BACKGROUND

The present invention relates to a clamping device for coupling together in leaktight manner two smooth tubes that are disposed end-to-end, the device comprising a sealing ring that is suitable for clamping around the facing ends of the two tubes, and that has first and second free ends, each of which is provided with a sealing arrangement, the sealing arrangements being designed to procure leaktight contact between said free ends when the ring is in a tightened state, the device further comprising first and second tightening lugs suitable for being moved relative to each other in order to bring the ring into the tightened state.

In general, such a device is made of metal.

A device of this type is known from Patent Application WO 00/75548. In such a known device, the sealing ring is disposed inside a sleeve on which tightening lugs are provided. The sleeve is relatively rigid and forms a shell for the ring, which is more flexible, the sealing arrangements provided at those free ends in the form of a tongue and of a notch deforming when said ends come into contact in order to procure leaktight contact.

That device is satisfactory, but it requires a large quantity of material, which is detrimental, in particular for devices of large diameter, e.g. of diameters as from about 200 millimeters (mm).

Document U.S. Pat. No. 4,165,109 also discloses a clamping device for coupling two smooth tubes together in leaktight manner, that device comprising a ring to which a tightening assembly is fastened that comprises an hourglass-shaped lug and bolts. In that device, the ring is not surrounded over its entire periphery. However, that ring is not a sealing ring having its ends provided with sealing arrangements procuring leaktight contact between the free ends of the ring in a tightened state. Said free ends never come into contact, but rather a deformable rubber sealing gasket or the like is disposed between them. In addition, that ring is more rigid than the tightening lug, since a portion of the strip that carries said lug must be flattened during the tightening so that the separate sealing gasket performs its function. Thus, that device uses a large quantity of material because a thick ring must surround almost the entire peripheries of the tubes. It also suffers from the drawback of implementing a separate gasket, made of a material of the rubber type, that can wear prematurely.

SUMMARY

An object of the invention is to remedy the drawbacks of the prior art by proposing a clamping device for coupling together two smooth tubes, in which device the quantity of raw material can be small and the ends of the sealing ring can come into leaktight contact.

This object is achieved by the fact that the first and second tightening lugs are fastened to the sealing ring, respectively in the vicinity of the first free end of said ring and in the vicinity of the second free end of said ring, and by the fact that the device has a bridge covering the sealing arrangements, the bridge being mounted to be stationary relative to the first free end of the ring and suitable for sliding relative to the second free end while the ring is being tightened.

In the meaning of the present text, the inside faces of the various elements are those ones of their faces that face towards the axis of the ring, their outside faces being the opposite faces. The "forward" direction is the direction in which the lugs move during tightening, and the "backward" direction is the opposite direction. The side edges are the edges that are spaced apart from each other along the axis of the ring. Thus, the side edges of the ring are the edges that extend around the circumference of the ring, while being separated from each other by the width of the ring.

In general, the sealing ring is made with a small thickness, in order to perform its sealing function. The lugs, which must be sufficiently rigid to withstand the tightening forces, are fastened to the ring. Thus, unlike with the situation described in WO 00/75548, the invention obviates the need for a sleeve, since the lugs are fastened directly to the ring. The bridge covers the outsides of the sealing arrangements that, for their part, procure leaktight contact between the ends of the ring. Insofar as it is mounted to be stationary relative to the first end, the bridge does not constitute an element that needs to be manipulated separately while the device is being put in place and while it is being tightened. In addition, by sliding relative to the second end, it can make the tightening forces uniform, and it can guide the tightening.

Optionally, the sealing arrangements of the first and second free ends of the sealing ring respectively comprise at least one tongue and at least one notch, tightening the ring causing the tongue to penetrate into the notch and causing the contact zones between the tongue and the notch to deform.

The sealing arrangements are thus made by forming simple shapes at the free ends of the ring.

Optionally, with the lugs and the ring being formed from strips of metal, the strip from which the ring is formed has a thickness (e) lying in the range 30% of the thickness of the strips from which the lugs are formed to 80% of said thickness of the strips from which the lugs are formed, and preferably in the range 40% to 60% of said thickness of the strips from which the lugs are formed.

Since the lugs need to be rigid in order to withstand the tightening forces, their thickness is relatively large. Conversely, the thickness of the ring is much smaller, thereby making a very substantial saving in material.

Optionally, the bridge is also made from a strip of metal, of thickness substantially equal to the thickness (e) of the strip from which the ring is made.

For example, the bridge may be made from the same metal sheet as the metal sheet from which the sealing ring is made. In general, the concept of "substantially equal" thickness covers the fact that the thickness of the bridge may be equal to the thickness of the sealing ring or may vary relative to that thickness over a range extending approximately from 10% to 20%.

Optionally, the lugs are formed of strip portions that are fastened to the ring, each of which strip portions covers said ring over a coverage angular sector lying in the range 10° to 50°, and preferably in the range 25° to 35°.

The length of the strip portions from which the lugs are formed is chosen so that they can be fastened to the sealing ring while also enabling the lugs to perform their tightening function. The length of these metal potions is short, since the Applicant has observed that the above-mentioned coverage angular sector is sufficient. If the lengths of the strip portions are totaled, a total coverage angular sector is obtained that lies approximately in the range 20° to 100°, i.e. about one fourth of one turn, which is much less than the full turn of Document WO 00/75548.

Optionally, at least one of the tightening lugs firstly has a tightening wall that is formed by a turned-out segment of the strip portion from which said lug is formed, which turned-out segment is configured to retain tightening means, and secondly has a loop having an end that is folded back between said strip portion and the ring.

In this situation, in an embodiment option, when the device is in the non-tightened state, a portion of the inside face of the end of the loop forms radial extra thickness extending inwards relative to the main inside surface of the strip portion, while, when the device is in the tightened state, said extra thickness is reabsorbed. The "main inside surface" of the strip portion is the inside surface that is formed in the portions of the ring that are curved so as to adopt the curvature of the sealing ring, apart from special arrangements of the inside surface of the strip portion, such as localized dimpling, rim holes, or setbacks.

For example, it is possible to make provision for the folded-back end to be received in a setback in the strip portion of depth substantially equal to the thickness of the folded-back end, and for one of the elements constituted by the inside face of said setback and by the outside face of the end of the loop has at least one bearing projection co-operating with the other of said elements.

While the device is being tightened, the lugs tend to bend over towards the axis of the sealing ring. Due to this bending over, the strip portions from which the lugs are formed move apart outwards to a small extent. For each lug, the initial radial extra thickness of the inside face of the folded-back end (optionally made by means of the above-mentioned projections) compensates for this moving away so that, in the tightened situation, the inside face of the folded-back end remains substantially in continuity with the main inside face of the strip portion (except for the setback in which said folded-back end is received) so as to procure continuity in bearing over the outside face of the sealing gasket and, therefore, so as to avoid leakage. In addition, the end of the loop that is folded back between the strip portion from which the turned-out segment is formed and the ring constitutes a reaction support when the lug tends to tilt towards the axis, said reaction support thereby limiting said tilting.

Optionally, the device has means for guiding the sliding of the bridge relative to the second free end of the ring.

For example, in the vicinity of the second free end of the ring, the edges of said ring are provided with tabs that co-operate with the edges of the bridge.

The device is thus easy to tighten, since the bridge remains aligned with the ring along their respective longitudinal axes.

Optionally, the device has at least one pair of first tightening lugs and one pair of second tightening lugs situated facing each other, the second lugs being formed from two strip portions that are fastened to the ring with a gap between them.

In which case, in an embodiment option, the bridge has a guide tab that extends in said gap.

Forming the lugs of each pair in distinct strip portions makes it possible to ensure that the tightening forces are exerted preferentially around a single one of the two tubes, the join plane between the two tubes finding itself in register with the gap between the strip portions that carry the lugs.

Thus, if the diameters of the tubes are slightly different, e.g. due to manufacturing tolerances, the clamping over each tube is optimized, thereby optimizing the leaktightness of the resulting assembly. The guide tab of the bridge takes advantage of said gap to participate in the above-mentioned guiding.

Optionally, the device has at least one pair of first tightening lugs and at least one pair of second tightening lugs situated facing each other, and two nut-and-bolt assemblies that co-operate with said pairs of first and second lugs, and the device is provided with means for limiting longitudinal movement of one of the nut-and-bolt assemblies while the other nut-and-bolt assembly is being tightened.

For example, with the nuts being designed to be retained by the lugs of one of the pairs, said lugs are formed from two strip portions fastened to the ring with a gap between them, and the bridge has a retaining tab that is turned out in said gap and with which at least one of the nuts is suitable to come into abutment on the side remote from the lugs.

Thus, while one of the nut-and-bolt assemblies is being tightened, thereby causing the shank of the bolt to advance into the nut, the nut of the other nut-and-bolt assembly remains approximately in its initial place, preventing the nut-and-bolt assembly from advancing so that it does not advance with the shank of the other assembly. As a result, after the first nut-and-bolt assembly has been tightened, the other nut-and-bolt assembly remains in its initial position, easily accessible so as to be tightened in its turn.

BRIEF DESCRIPTION OF THE DRAWINGS

The invention can be well understood and its advantages appear more clearly on reading the following detailed description of an embodiment shown by way of non-limiting example. The description refers to the accompanying drawings, in which.

DETAILED DESCRIPTION

Figure 1:
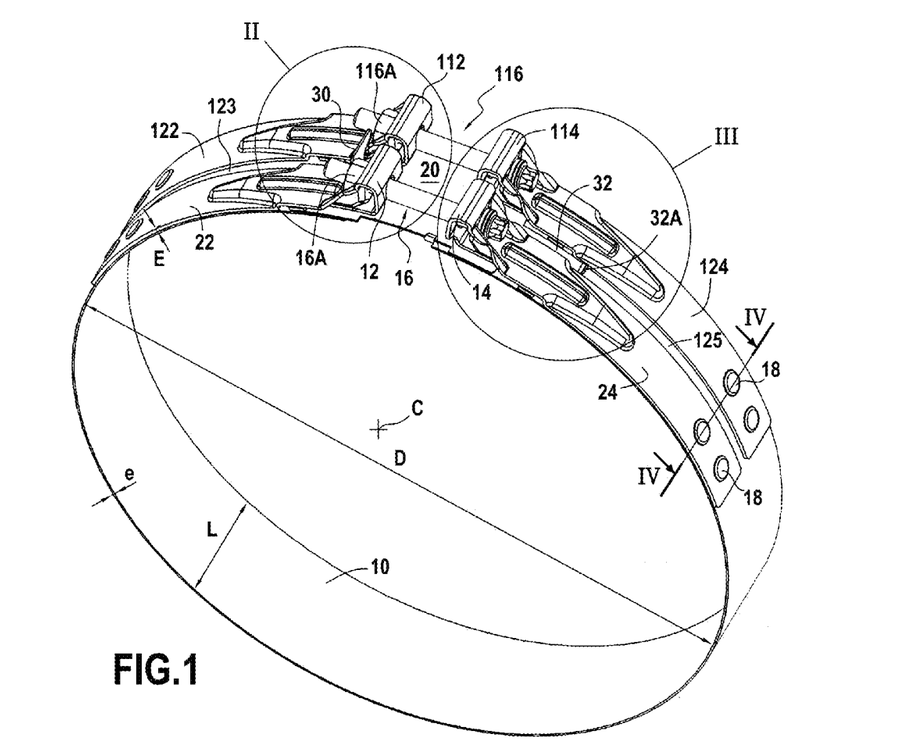
FIG. 1 is a perspective view of a clamping device of the invention, in the non-tightened state.
Figure 2:
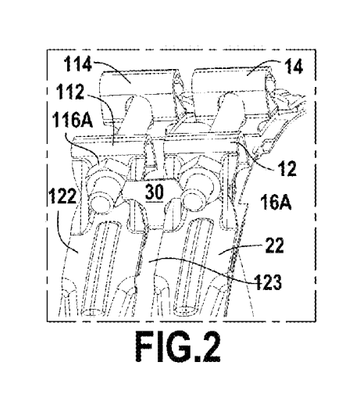
FIGS. 2 and 3 are enlargements of zones II and III of FIG. 1.
Figure 3:
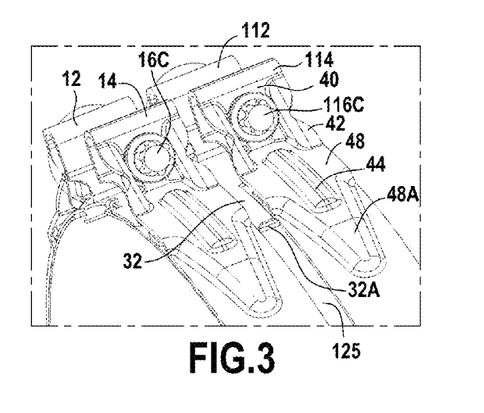

As can be seen in FIG. 1, the clamping device comprises a sealing ring 10 to which tightening lugs are fastened. In this example, the lugs comprise a pair of first tightening lugs 12, 112, and a pair of second tightening lugs 14, 114, the first and second lugs of each pair being situated facing each other. For tightening the device, the first and second facing lugs are moved relative to each other (in this example, they are moved towards each other) by a tightening assembly. In this example, two tightening assemblies 16, 116 are provided for respective ones of the facing lugs 12, 14 and for the facing lugs 112, 114. In this example, these tightening means are of the nut-and-bolt type.

In this example, each tightening lug is carried by a strip portion. Thus, there are strip portions 22, 122 that carry respective ones of the first lugs 12, 112, and strip portions 24, 124 that carry respective ones of the second lugs 14, 114. The strip portions are fastened to the sealing ring 10 at fastening points 18, which, in this example, are welds. More precisely, the strip portions from which the lugs are formed are welded to the sealing ring 10 in zones of the ring that form indents in the inside face of said ring. This can be more clearly in FIG. 4, in which the indents 10D can be seen. Thus, any blisters due to the welding remain confined in the indent, without affecting the geometrical shape of the inside periphery of the ring 10, and thus without affecting the quality of its contact with the tubes. Alternatively, the fastening points could be formed by riveting, clinching, or crimping. Regardless of the chosen mode of fastening, provision is advantageously made to fasten the strip portions to the ring in zones of said ring that form indents in the inside face of the ring, as described above with reference to the welds. Thus, the contact between the ring and the tubes is not degraded: if fastening the strip portions to the ring has an impact on its internal geometrical shape, such impact is limited to the end-walls of the indents.

Figure 5:
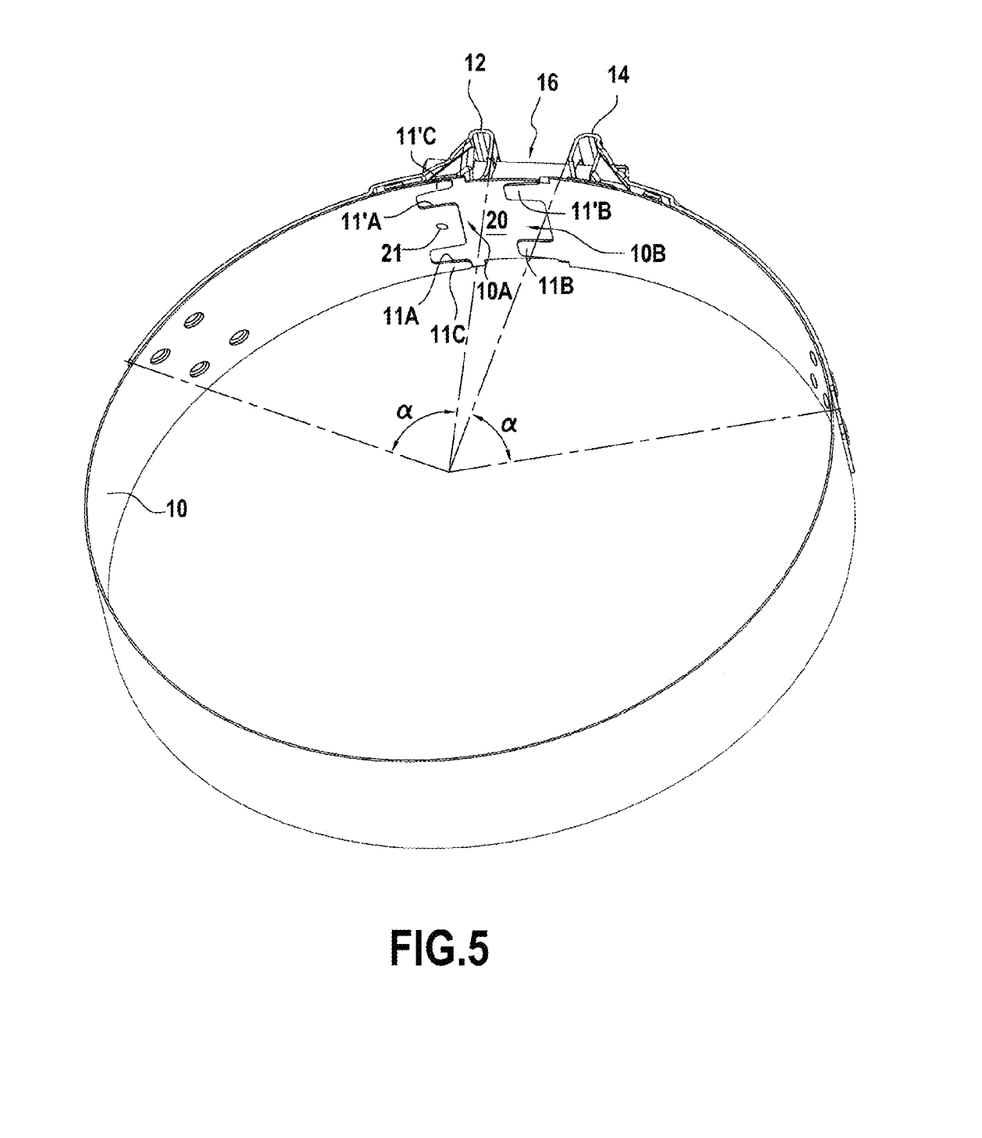
FIG. 5 is a perspective view of the device of FIG. 1, seen looking from a different angle and showing the inside face of the ring in the region of its free ends.

As can be seen in FIG. 5, the first free end 10A and the second free end 10B of the sealing ring 10 have respective sealing arrangements. In this example, these arrangements comprise respectively at least one tongue and at least one notch, the ring being tightened causing the tongue to penetrate into the notch and causing the contact zones between the tongue and the notch to deform. Thus, the sealing takes place in the manner indicated in Document WO 00/75548.

In this example, it can be seen that the first end 10A of the ring 10 is provided with two notches, respectively 11A and 11'A, while the second end 10B is provided with two tongues, respectively 11B and 11'B. As indicated in Document WO 00/75548, the tongues are slightly too wide for the notches so that the tongues penetrating into the notches deforms the contact zones, thereby providing the sealing. To this end, the notches 11A and 11'A are flanked on their laterally outermost sides by tabs, respectively 11C and 11'C, which may be slightly flexible.

As in Document WO 00/75548, the width of the tongues may decrease going towards their free ends, and, likewise, the width of the notches may decrease going towards their end-walls.

It should be noted that, in order to provide its sealing function, the sealing ring is made of a strip of metal that is particularly thin. This facilitates the small amounts of deformations that are necessary for providing the sealing, both for matching the outside shapes of the tubes clamped together by means of the device and for deforming the above-mentioned contact zones between the tongues and the notches.

Figure 4:
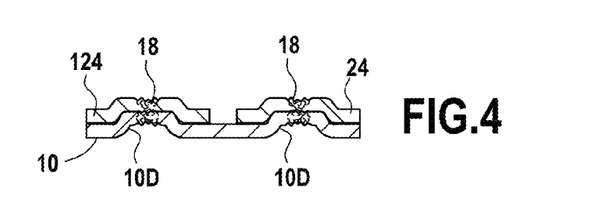
FIG. 4 is a section view on plane IV-IV of FIG. 1.

It be seen in particular in FIGS. 1 and 4 that the device further comprises a bridge 20 that covers the sealing arrangements. This bridge is disposed between the outside periphery of the ring 10 and the tightening lugs. Thus, when the system is in place and tightened around the ends of the tubes that it serves to couple together, the join plane between said tubes being situated in the vicinity of the middle of the width of the strip 10, the radial sealing is provided by the presence of the bridge 20, while the lateral sealing is provided by the co-operation between the above-described sealing arrangements.

Figure 6:
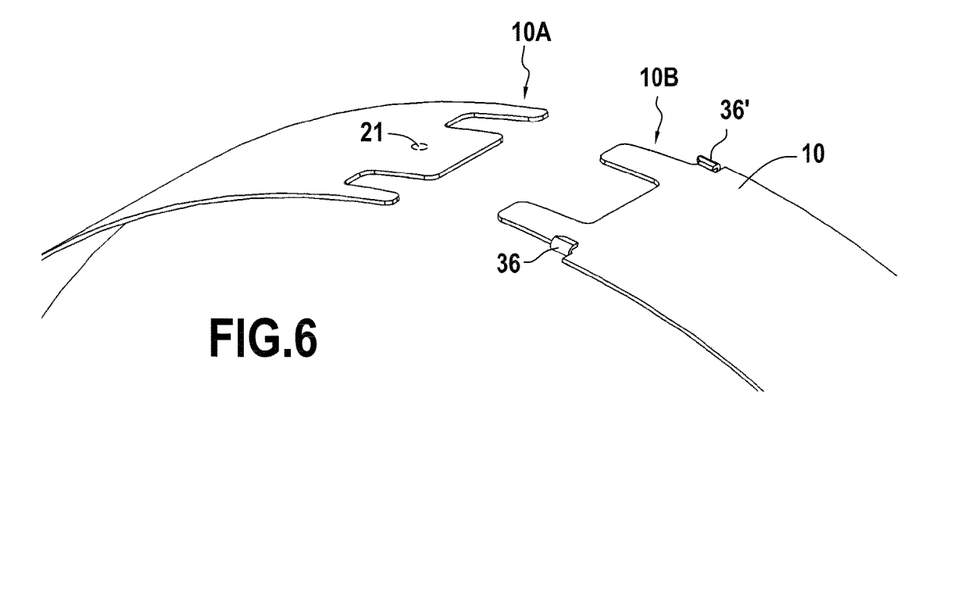
FIG. 6 is a fragmentary perspective view showing the sealing ring in the region of its free ends.
Figure 7:
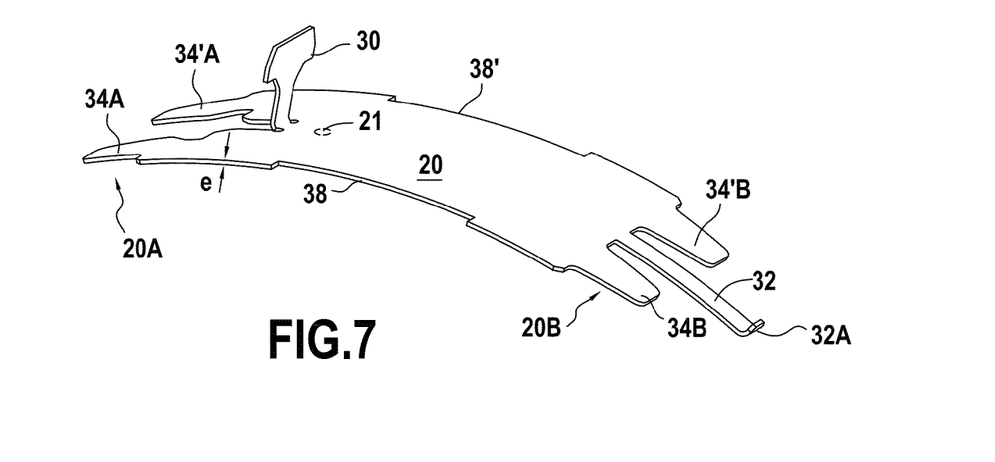
FIG. 7 is a perspective view showing the bridge.

By referring to FIGS. 6 and 7, the structure of the bridge and how it is assembled onto the sealing ring can be better understood. As can be seen in FIG. 7, the bridge is in the form of a metal plate that is curved so that its radius of curvature corresponds substantially to the initial radius of curvature of the ring. The bridge is designed to be fastened to the first end 10A of the ring, and FIGS. 6 and 7 show the position of the fastening point 21 that can also be seen in FIG. 5. This fastening takes place, in particular, by welding. Insofar as the bridge and the ring are of small thickness and insofar as, unlike the weld spots 18 whereby the lugs are welded to the ring, the weld spot 21 is subjected to little traction force, it is not necessary for the weld spot 21 to be as strong as the weld spots 18. Thus, it is not necessary to form the weld spot 21 in indents because the weld is sufficiently small not to affect the internal geometrical shape of the ring 10. Similarly, the weld spot 21 may be replaced with some other fastening means, e.g. of the type using clinching, riveting, or crimping. It is possible, for example, to fasten the bridge by means of side tabs on the ring that penetrate into notches provided for that purpose in the side edges of the bridge, and folded back against the outside face of the bridge.

It can be seen in FIG. 7 that, in the vicinity of its first end 20A, the bridge 20 has a turned-out tab 30. It can be understood that this tab is formed by being cut out from the first end 20A, and then by being folded so as to be turned out. It can also be seen that, on either side of the central cutout in which the tab 20 is formed, the first end 20A of the bridge has two extensions in the form of tongues, respectively 34A and 34'A. When the bridge is assembled, these tongues are positioned under respective ones of the strip portions 22 and 122 from which the first lugs 12 and 112 are formed.

Similarly, the second end 20B of the bridge 20 is provided with two extensions in the form of tongues, respectively 34B and 34'B, which, when the bridge is fitted, are situated under the strip portions 24 and 124 that carry the lugs 14 and 114. Between the two tongues 34B and 34'B, the bridge has a guide tab 32 that extends it along its circumference, and the free end 32A of which is turned out. The function of the tabs 30 and 32 is explained below.

With reference to FIG. 6, it can be seen that the side edges of the ring 10 are provided with tabs 36, 36', situated in the vicinity of the second free end 10B of the ring. These tabs are designed to co-operate with the side edges of the bridge 20 to guide it as it is sliding relative to the second end 10B of the ring 10. In this example, the side edges of the bridge are provided with notches 38, 38' corresponding to a reduction in the width of said bridge. Thus, the tabs 36, 36' can co-operate with the end-walls of the notches 38 and 38' without moving laterally outwards. In addition, in FIG. 6, the tabs 36 and 36' are folded back in such a manner as to cover the edges of the bridge 20 (or the end-walls of the notches) radially to a small extent. This facilitates holding the bridge in position by preventing it from moving radially.

In order to fit the bridge onto the ring, it is placed in such a manner that it covers the ends of the ring and in such a manner that the weld 21 can be performed. The tabs 36 and 36' are folded back after the bridge has been put in place.

The shaping of tightening lugs is described below with reference to FIGS. 8 to 10. In the figures, the example of the first tightening lug 12 is taken, it being understood that, in the example shown, all of the tightening lugs are analogous.

The tightening lug 12 is formed from a strip portion 22 of curvature matching the radius of curvature of the sealing ring 10. The lug is formed at the front end of the strip portion. It can be seen in FIG. 9 that the tightening lug 12 has a tightening wall 40 that is formed by a turned-out segment of the strip portion from which said lug is formed. Said turned-out segment 40 is thus configured to retain tightening means (nut, or bolt head). At its front end, opposite from the rear end 22' of the strip portion 22, the lug 12 has a loop 46 having its end 46A folded back under the strip portion 22. Thus, when the strip portion 22 is in place on the ring 10, said end 46A is folded back between said strip portion and the ring. The tightening wall 40 and the loop 46 are provided with holes, respectively 40' and 46' that are aligned for receiving the shank of a tightening bolt or the like (axial tie, pin, etc.). It can be seen that the hole 46' is oblong, since the loop 46 tends to tilt slightly during tightening.

Generally, the shaping of the tightening lug is analogous to what Document FR 2 902 175 describes. In this example, the tightening wall 40 is formed in a stamped-out segment of the strip portion 22, the edges 42 of the stamped-out segment thus forming stiffening ribs, on either side of the tightening wall. Seen from the side, these ribs are thus substantially in the shape of triangular set squares.

In general manner, the lug has stamped-out segments or ribs for reinforcing the rigidity of the strip portions and, in particular, the rigidity of the lugs. The stamped-out segment from which the tightening wall 40 is formed is mentioned above. It can also be observed that a stamped-out rib 44 projects from the outside face of the strip portion 22, this rib being situated just behind the lug in the direction going towards the opposite free end 22' of the strip portion.

In addition, this strip portion 22 has a stamped-out segment 48 that, on the inside face of said strip portion, forms a setback 49 (see FIG. 8) for receiving the thickness of the folded-back end 46A of the loop 46. Thus, the inside face of said folded-back end extends in continuity with the inside face of the remainder of the strip portion 22.

The stamped-out segment 48 has a first portion that is situated in the vicinity of the lug 40 and that extends over the entire width of the strip portion, so as to receive the width of the folded-back end 46A. Going towards the free end 22' of the strip portion 22, the stamped-out segment 48 has an end portion 48A that tapers going towards the free end 22' of the strip portion. It can be observed in FIG. 8 that the length of the folded-back end 46A is less than the length of the stamped-out segment 48, so that the folded-back end 46A does not reach the end 48A of the stamped-out segment. In reality, for material-saving reasons, the folded-back end is not formed with a length that is too long. However, the stamped-out segment 48 is extended intentionally over its end portion 48A. This makes it possible to stiffen the strip portion beyond the free end 46A, and thus some distance away from the lug 12. During tightening, under the effect of the traction forces exerted on the tie, or on the shank of the bolt being tightened, the lugs tend to bend over towards the center of the clamping ring, as indicated by the arrows F. The folded-back end 46A of the loop 46 then exerts a reaction force against the inside face of the stamped-out segment 48 so as to prevent excessive bending-over of the lugs. The extension 48A of the stamped-out segment stiffens the strip portion 22 in such manner as to enhance the intensity of the reaction forces.

Figures 8, 9, 10:
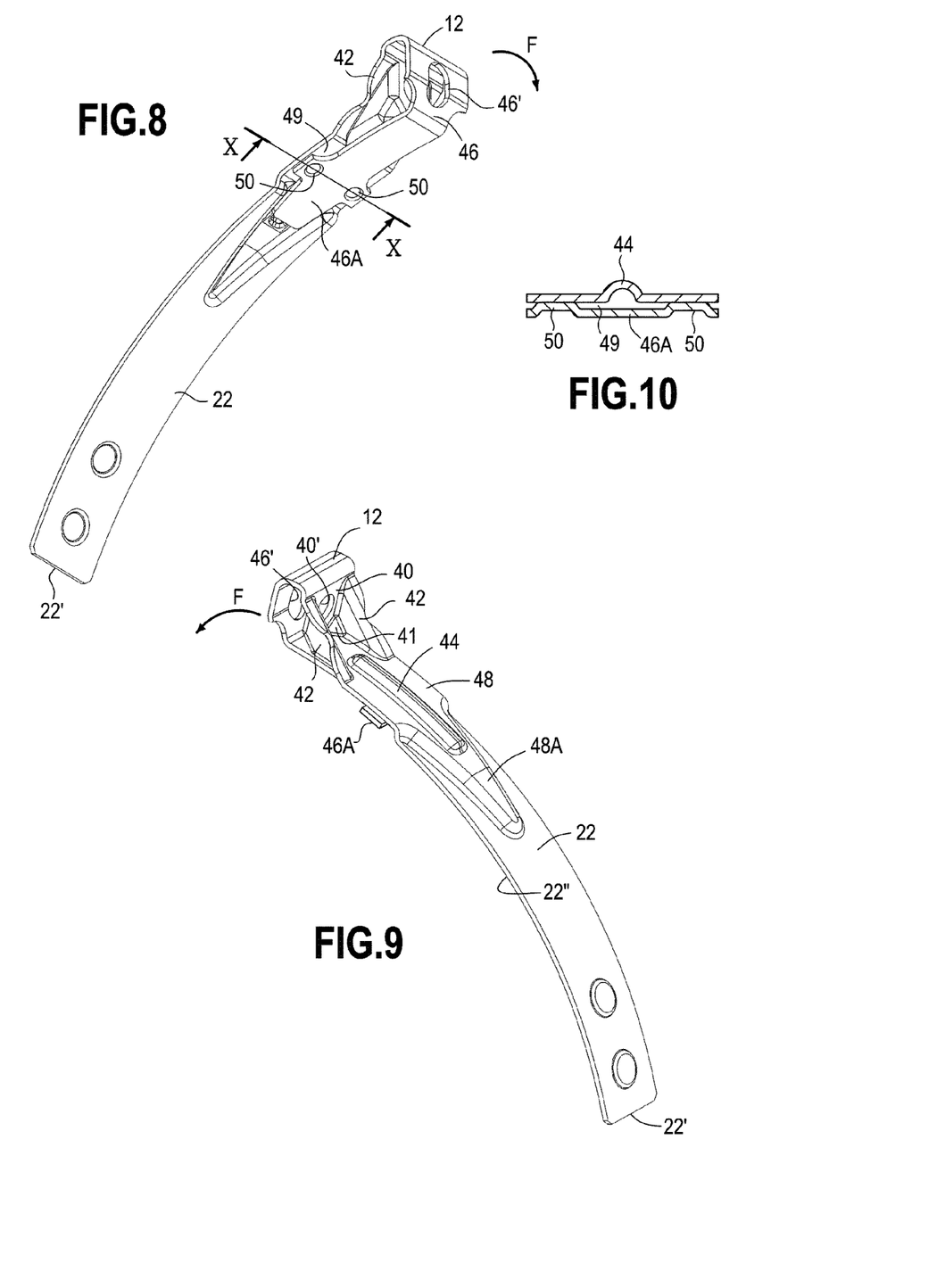
FIG. 8 is a perspective view seen looking from below, showing a tightening lug carried by a strip portion, seen from the inside of said portion.
FIG. 9 is a view analogous to FIG. 8, but that is seen from the outside of the strip portion.
FIG. 10 is a section view on plane X-X of FIG. 8.

In addition, as can be seen in FIGS. 8 and 10, the outside face of the end 46A of the loop 46 is provided with bearing projections 50 that co-operate with the inside face of the strip portion 22. An inverse configuration could be imagined, with projections formed on the inside face of the strip portion 22, for co-operating with the outside face of the folded-back end 46A. As can be seen in FIG. 10, these projections 50 locally maintain a slight distance between the bottom-wall of the setback 49 and the remainder of the outside face of the end 46A. The depth of the indent 49, as measured radially, is equal to or substantially equal to the thickness of the folded-back end 46A. As a result, and as can be seen in FIG. 9, the inside face of the folded-back end 46A thus forms a small amount of extra thickness relative to the main segment 22" of the inside face of the strip portion 22. When the lug 12 tends to bend over under the effect of the traction forces exerted during tightening, the segment of the strip portion 22 that is situated immediately behind the lug tends to move away from the axis of the strip portion (which, when the strip portion is fastened to the ring 10, is the axis C of the ring). The amplitude of this moving away corresponds to the radial height of the projections 50 so that, in spite of this moving away, the inside face of the folded-back end 46A remains at the desired radius, and thus provides continuity in bearing against the surface of the tube surrounded by the ring.

As indicated above, the bridge 20 is provided with extension in the form of tongues 34A, 34'A, 34B, and 34'B that extend under the strip portions that carry the lugs. During the tightening, these extensions in the form of tongues extend under the folded-back ends 46A of the lugs or under the regions of the strip portions 22, 122, 24 and 124 that are situated behind said folded-back ends. Thus, in the regions subjected to bending-over stresses, the bending-over reaction forces are exerted over zones in which the thickness of the extensions in the form of tongues is added to the thickness of the ring 10, the capacity of these zones to withstand such forces thus being increased.

The strip portions from which the lugs are formed do not encircle the sealing ring. These portions cover the ring only over a relatively small coverage angular sector. As can be seen in particular in FIG. 5, the coverage angular sector a of coverage between the strip portions and the sealing ring is approximately in the range 10° to 50°, and preferably approximately in the range 25° to 35°.

The lugs and the strip portions that carry them are subjected to large stresses while the device is being tightened. Therefore said lugs and said strip portions must have sufficient rigidity and sufficient resistance to forces, which is what the above-mentioned stamped-out segments are provided for, and which is why the thickness of the strip portions must be sufficiently large. Conversely, as indicated above, it must be possible for the sealing ring to be deformed slightly in order to perform its sealing function. Said sealing ring must therefore be of limited thickness. By making provision for the strip portions to cover the sealing ring over only relatively small angles, a very significant amount of material is saved, relative to what is disclosed by Document WO 00/75548.

For example, the thickness e of the ring lies in the range 30% of the thickness E of the strip portions from which the lugs are formed to 80% of that thickness E, and preferably in range 40% of said thickness E to 60% thereof.

Figure 13:
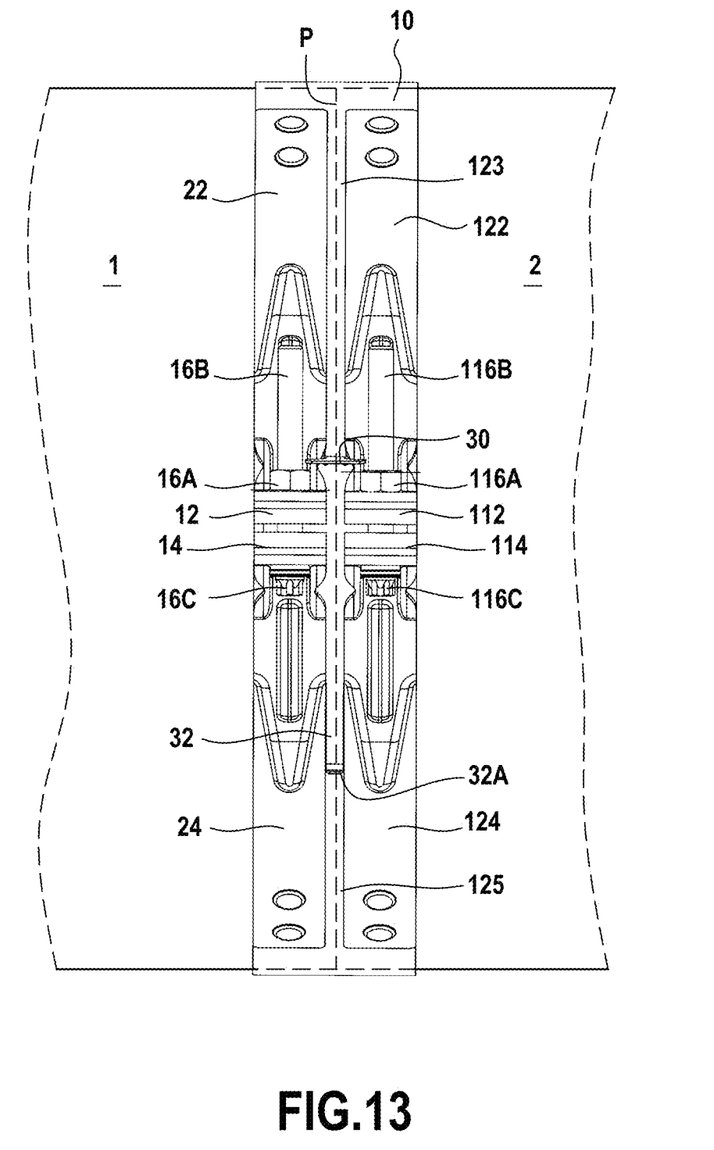
FIG. 13 is a plan view showing the device in the tightened state, in which it is clamped around two tubes that it serves to couple together.

Provision is made for the width L of the sealing ring 10 to cover the sufficient length of the ends of the tubes as assembled together by means of the device, as shown in FIG. 13.

The invention is applicable in particular to clamping devices of relatively large diameter, the diameter D of the sealing ring lying, for example, in the range 200 mm to 400 mm, and more particularly in the range 250 mm to 350 mm. For example, the thickness e of the sealing ring lies in the range $1/400^{th}$ to $1/200^{th}$ of the diameter D of said ring.

The thickness e of the bridge 20 is equal to the thickness e of the ring 10, it being possible for these two elements to be made from the same metal sheet.

The clamping device of the invention could have only one first lug and one second lug that are situated facing each other and that are moved relative to each other by any suitable tightening means. In this case, as is indicated above, the diameter D of its ring is quite large, its width L, as measured parallel to the axis C of the ring, being itself quite large, e.g. approximately in the range 45 mm to 70 mm, and in particular approximately in the range 50 mm to 60 mm.

Therefore, as in the example shown, it is advantageous to have a plurality of first lugs and plurality of second lugs, and in particular two first lugs and two second lugs.

In addition, in order to provide the clamping device with two first lugs and with two second lugs, it is possible to form the first lugs from the same strip portion of width substantially analogous to the width of the ring, and to proceed in the same manner for the second lugs.

However, in the device shown by way of example, each lug is formed from a specific strip portion. In addition, the two strip portions from which the first lugs 12 and 112 are formed are fastened to the ring 10 while providing a gap 123 between them. In addition, the two strip portions 24, 124 from which the lugs 14 and 114 are formed are fastened to the ring while providing a gap 125 between them. Firstly, material is thus saved, because the width of the strip portions is limited to what is strictly necessary for the lugs to perform their function. Secondly, the gaps 123 and 125 are used advantageously for various functions.

Figure 11:
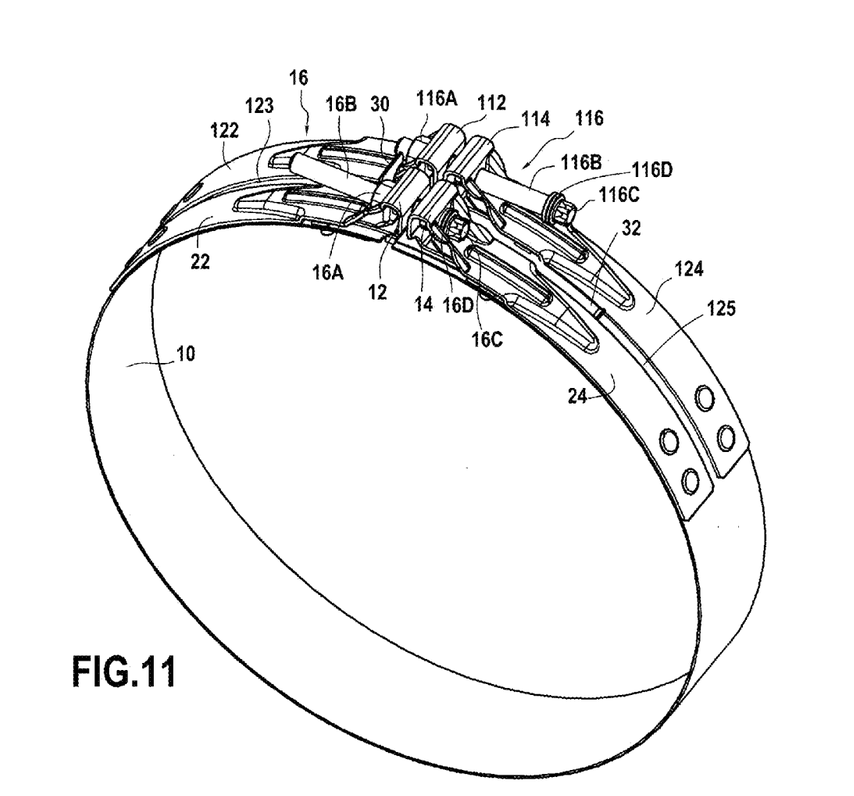
FIG. 11 is a view analogous to FIG. 1, but showing the device while it is being tightened.
Figure 12:
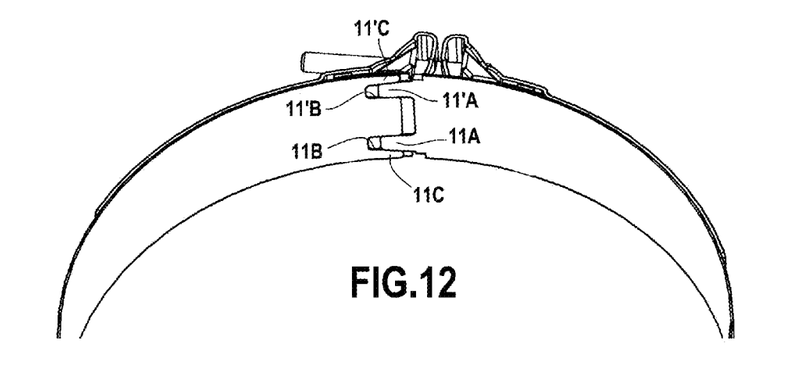
FIG. 12 is a fragmentary perspective view showing the situation of the free ends of the sealing ring while the device is being tightened.

The guide tab 32 of the bridge 20 extends in the gap 125, as can be seen in particular in FIGS. 1, 11, and 13. Insofar as each of the facing side edges of the strip portions 24 and 124 is in a plane perpendicular to the axis of the ring 10, those edges are parallel and thus constitute guide edges for guiding the tab 32. The fact that the free end 32A of said tab is turned out facilitates its contact with the inner side edges of the strip portions 24 and 124, without any risk of said tab coming to jam between said strip portions and the ring.

In addition, as can be seen in FIG. 11, the two tightening assemblies 16 and 116 are not necessarily tightened simultaneously. In this case, in FIG. 11, the first tightening assembly 16 has been tightened, while the second tightening assembly 116 is still in the non-tightened state.

As indicated above, each tightening assembly may be of the nut-and-bolt type. Thus, each of the tightening assemblies 16 and 116 comprises a nut, respectively 16A and 116A, in abutment against the first lugs 12 and 112, and a bolt having its shank, respectively 16B and 116B, passing through the holes in the lugs, and having its head, respectively 16C and 116C, retained against a second lug 14, 114. As can be seen in FIG. 9, the first lugs 12 and 112 may have anti-turn arrangements for preventing the nuts 16A and 116A from turning. For example, the nuts have a plurality of flats, and the end-wall of the stamped-out segments from which the tightening walls are formed also have flats 41 as indicated in FIG. 9. This can also constitute a difference between the first and second lugs, which are otherwise analogous. However, depending on the shaping of the heads 16C and 116C of the bolts or on the presence of any spacer washers 16D, 116D between said bolt heads and the second lugs, the flats analogous to the flats 41 can equip said second lugs without preventing the bolt heads from turning.

In addition, it is necessary to prevent the nuts from tending to move away from the tightening walls of the first lugs 12 and 112 while the tightening assemblies 16 and 116 are being tightened. This is what the retaining tab 30 is used for. In particular in FIGS. 1, 11, and 13, it can be seen that this tab 30 is turned out into the gap 123, and that its flanges (the tab is T-shaped as can be seen in FIG. 7) extend respectively behind the nuts 16A and 116A, i.e. on that side of the nuts that is remote from the first lugs 12 and 112. Thus, the flanges of the tab 30 form abutments opposing moving away of the nuts during tightening. With reference to FIG. 11, it can be seen that it has been possible for the nut 16A to remain in place during the tightening of the first tightening assembly. Insofar as the second tightening assembly has not yet been stressed, there is a risk that the shank 116B of the bolt of said assembly might tend to be retained by the first lug 114, while advancing at the same time as the shank of the bolt of the other assembly 16 is being tightened. In such a situation, the head 116C of the bolt of the second tightening assembly would then be difficult for the tightening tool to access. The tab 30 thus prevents this movement accompanying the movement of the lugs towards each other.

Naturally, the same function of retaining the nuts could be obtained by means of two tabs, i.e. one tab per nut.

FIG. 13 shows the device as tightened so that it clamps around the ends of two tubes 1 and 2. The join plane P between the two tubes lies in the middle region of the width of the device, and is shown by a dashed line P. With reference to this figure, another advantage of using a specific strip portion carrying a respective lug can be understood. The join plane P is situated in a zone of the device that corresponds to the gaps 123, 125 between the strip portions. Thus, the strip portions 22 and 24, and 122 and 124 serve to tighten the device respectively onto the tube 1 and onto the tube 2. Therefore, if said tubes have slight disparities in diameter, the tightening must be optimized on each tube.

For example, the device is made of annealed stainless steel. It may be austenitic stainless steel, or ferritic stainless steel, which is less costly. For example, the strip portions that carry the lugs may be made of 1.4509 ferritic stainless steel, while the sealing ring and the bridge may be made of 1.4016 ferritic stainless steel.

The invention claimed is:

1. A clamping device for coupling together in leaktight manner two smooth tubes that are disposed end-to-end, the device comprising: a sealing ring that is suitable for clamping around the facing ends of the two tubes, and that has a first free end provided with a first sealing arrangement and a second free end provided with a second sealing arrangement, the first and second sealing arrangements being designed to procure leaktight contact between said free ends when the ring is in a tightened state, the device further comprising first and second tightening lugs suitable for being moved relative to each other in order to bring the ring into the tightened state, the first and second tightening lugs being secured to the sealing ring, respectively in the vicinity of the first free end of said ring and in the vicinity of the second free end of said ring, so that the first and second tightening lugs are respectively located at the first sealing arrangement and at the second sealing arrangement and the device having a bridge covering the sealing arrangements between said first and second tightening lugs, the bridge being mounted to be stationary relative to the first free end of the ring and suitable for sliding relative to the second free end while the ring is being tightened;

wherein the first and second sealing arrangements respectively comprise at least one tongue and at least one notch, tightening the ring causing the tongue to penetrate into the notch and causing the contact zones between the tongue and the notch to deform.

2. A device according to claim 1, wherein the lugs and the ring are formed from strips of metal, the strip from which the ring is formed has a thickness (e) lying in the range 30% of the thickness of the strips from which the lugs are formed to 80% of said thickness of the strips from which the lugs are formed.

3. A device according to claim 1, wherein the lugs and the ring are formed from strips of metal, the strip from which the ring is formed has a thickness lying in the range 40% of the thickness of the strips from which the lugs are formed to 60% of said thickness of the strips from which the lugs are formed.

4. A device according to claim 1, wherein the ring is made from a strip of metal and the bridge is also made from a strip of metal, of thickness substantially equal to the thickness of the strip from which the ring is made.

5. A device according to claim 1, wherein the lugs are formed from strip portions which have stamped-out portions or ribs that are designed to reinforce the rigidity of said strip portions.

6. A device according to claim 1, wherein at least one of the tightening lugs is formed from a strip portion, and firstly has a tightening wall that is formed by a turned-out segment of said strip portion, which turned-out segment is configured to retain tightening means, and secondly has a loop having an end that is folded back between said strip portion and the ring.

7. A device according to claim 6, wherein the folded-back end of the loop is received in a setback in the strip portion, said setback having a depth substantially equal to a thickness of the said folded-back end.

8. A device according to claim 6, wherein one of the inside face of the strip portion and the outside face of the end of the loop has at least one bearing projection that co-operates with the other one of said inside face of the band strip and the outside face of the end of the loop.

9. A device according to claim 6, wherein:
the folded-back end of the loop is received in a setback in the strip portion, said setback having a depth substantially equal to a thickness of the said folded-back end, and
one of the inside face of the strip portion and the outside face of the end of the loop has at least one bearing projection that co-operates with the other one of said inside face of the band strip and the outside face of the end of the loop.

10. A device according to claim 1, wherein the sliding of the bridge is guided relative to the second free end of the ring.

11. A device according to claim 10, wherein, in the vicinity of the second free end, the edges of the ring are provided with tabs that co-operate with the edges of the bridge.

12. A device according to claim 1, having at least one pair of first tightening lugs and one pair of second tightening lugs situated facing each other, the second lugs being formed in two strip portions that are fastened to the ring with a gap between said two strip portions, and the bridge having a guide tab that extends in said gap.

13. A device according to claim 1, having at least one pair of first tightening lugs and at least one pair of second tightening lugs situated facing each other, and two nut-and-bolt assemblies that co-operate with said pairs of first and second lugs, and longitudinal movement of one of the nut-and-bolt assemblies while the other nut-and-bolt assembly is being tightened being limited.

14. A device according to claim 1, having at least one pair of first tightening lugs and at least one pair of second tightening lugs situated facing each other, and two nut-and-bolt assemblies that co-operate with said pairs of first and second lugs being designed to be retained by the lugs of one of the pairs, said lugs being formed from two strip portions fastened to the ring with a gap between said strip portions, and the bridge having a retaining tab that is turned out in said gap and with which at least one of the nuts is suitable to come into abutment on the side remote from the lugs.

15. A clamping device for coupling together in leaktight manner two smooth tubes that are disposed end-to-end, the device comprising: a sealing ring that is suitable for clamping around the facing ends of the two tubes, and that has a first free end provided with a first sealing arrangement and a second free end provided with a second sealing arrangement, the first and second sealing arrangements being designed to procure leaktight contact between said free ends when the ring is in a tightened state, the device further comprising first and second tightening lugs suitable for being moved relative to each other in order to bring the ring into the tightened state, the first and second tightening lugs being secured to the sealing ring, respectively in the vicinity of the first free end of said ring and in the vicinity of the second free end of said ring, so that the first and second tightening lugs are respectively located at the first sealing arrangement and at the second sealing arrangement and the device having a bridge covering the sealing arrangements between said first and second tightening lugs, the bridge being mounted to be stationary relative to the first free end of the ring and suitable for sliding relative to the second free end while the ring is being tightened;

wherein the lugs are formed from strip portions that are fastened to the ring, each of which strip portions covers said ring over an angular sector lying in the range 10° to 50°.

16. A device according to claim 15, wherein the first and second sealing arrangements respectively comprise at least one tongue and at least one notch, tightening the ring causing the tongue to penetrate into the notch and causing the contact zones between the tongue and the notch to deform.

17. A device according to claim 15, wherein the lugs are formed from strip portions that are fastened to the ring, each of which strip portions covers said ring over an angular sector lying in the range 25° to 35°.

18. A device according to claim 15, wherein the lugs are formed from strip portions which have stamped-out portions or ribs that are designed to reinforce the rigidity of said strip portions.

19. A device according to claim 15, wherein at least one of the tightening lugs is formed from a strip portion, and firstly has a tightening wall that is formed by a turned-out segment of said strip portion, which turned-out segment is configured to retain tightening means, and secondly has a loop having an end that is folded back between said strip portion and the ring.

20. A clamping device for coupling together in leaktight manner two smooth tubes that are disposed end-to-end, the device comprising: a sealing ring that is suitable for clamping around the facing ends of the two tubes, and that has a first free end provided with a first sealing arrangement and a second free end provided with a second sealing arrangement, the first and second sealing arrangements being designed to procure leaktight contact between said free ends when the ring is in a tightened state, the device further comprising first and second tightening lugs suitable for being moved relative to each other in order to bring the ring into the tightened state, the first and second tightening lugs being secured to the sealing ring, respectively in the vicinity of the first free end of said ring and in the vicinity of the second free end of said ring, so that the first and second tightening lugs are respectively located at the first sealing arrangement and at the second sealing arrangement and the device having a bridge covering the sealing arrangements between said first and second tightening lugs, the bridge being mounted to be stationary relative to the first free end of the ring and suitable for sliding relative to the second free end while the ring is being tightened;

wherein the lugs are formed from strip portions which are fastened to the ring in zones of the ring that form indents in the inside face of the ring.

* * * * *